United States Patent [19]
McFarland

[11] Patent Number: 6,086,352
[45] Date of Patent: Jul. 11, 2000

[54] APPARATUS FOR EXTRUDING PRODUCTS MADE UP OF COMPOSITE MATERIALS

[76] Inventor: Archie Rae McFarland, 84 High Country Rd., Herriman, Utah 84065

[21] Appl. No.: 09/198,749

[22] Filed: Nov. 24, 1998

Related U.S. Application Data

[63] Continuation-in-part of application No. 08/844,607, Apr. 12, 1997, abandoned.

[51] Int. Cl.⁷ .................................................. B29C 47/12
[52] U.S. Cl. .................................. 425/131.1; 425/192 R; 425/463
[58] Field of Search ............................. 425/131.1, 133.1, 425/190, 192 R, 130, 463; 264/75

[56] References Cited

U.S. PATENT DOCUMENTS

| | | | |
|---|---|---|---|
| 1,947,541 | 2/1934 | Wengel | 425/131.1 |
| 2,722,177 | 11/1955 | Routh | 425/131.1 |
| 3,014,437 | 12/1961 | Dutchess | 425/131.1 |
| 3,884,605 | 5/1975 | Grelon | 425/131.1 |
| 3,886,973 | 6/1975 | Kinney | 425/131.1 |
| 4,200,959 | 5/1980 | Cheney | 425/308 |
| 4,480,980 | 11/1984 | McFarland et al. | 425/131.1 |
| 4,900,572 | 2/1990 | Repholz et al. | 425/131.1 |
| 5,670,185 | 9/1997 | Heck et al. | 425/133.1 |

*Primary Examiner*—David A. Simmons
*Assistant Examiner*—Robert A. Hopkins
*Attorney, Agent, or Firm*—Mallinckrodt & Mallinckrodt

[57] ABSTRACT

Apparatus for extruding composite products, especially food products such as simulated bacon slabs having components representing meat and fat, respectively, that replicate the random pattern of natural bacon slabs. The apparatus has an extrusion die member which, in some embodiments, is rotatably mounted for manual or motorized movement from one selected position of adjustability to another selected position of adjustability about a substantially circular path of adjustability that is preferably visually indexed to indicate the extent of any positional adjustment of the extrusion die from time-to-time. The apparatus may include a standard sausage stuffing machine for controlling movement of the extrusion die. In all embodiments of the die, it is independent of the apparatus in which it is adapted to be installed so as to be easily removable and replaceable relative to such apparatus, but need not be rotatable. In one embodiment of the die, a plurality of elongate extrusion conduits are spaced apart in spiral formation to provide an extruded natural food product having spiral layers of different food materials, such as synthetic pork belly bacon having fat and flesh layers of chicken or turkey white meat and dark meat, respectively.

19 Claims, 6 Drawing Sheets

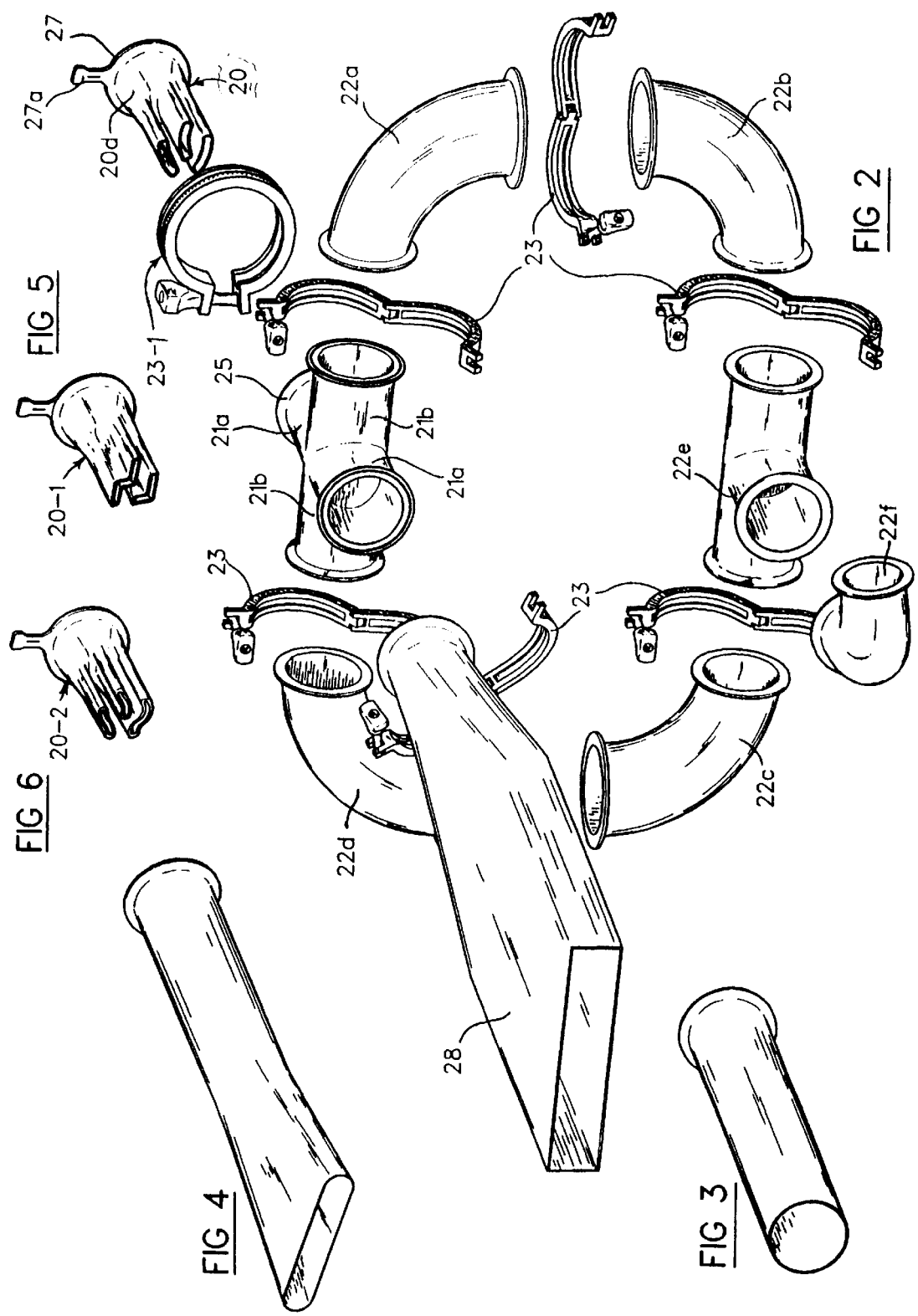

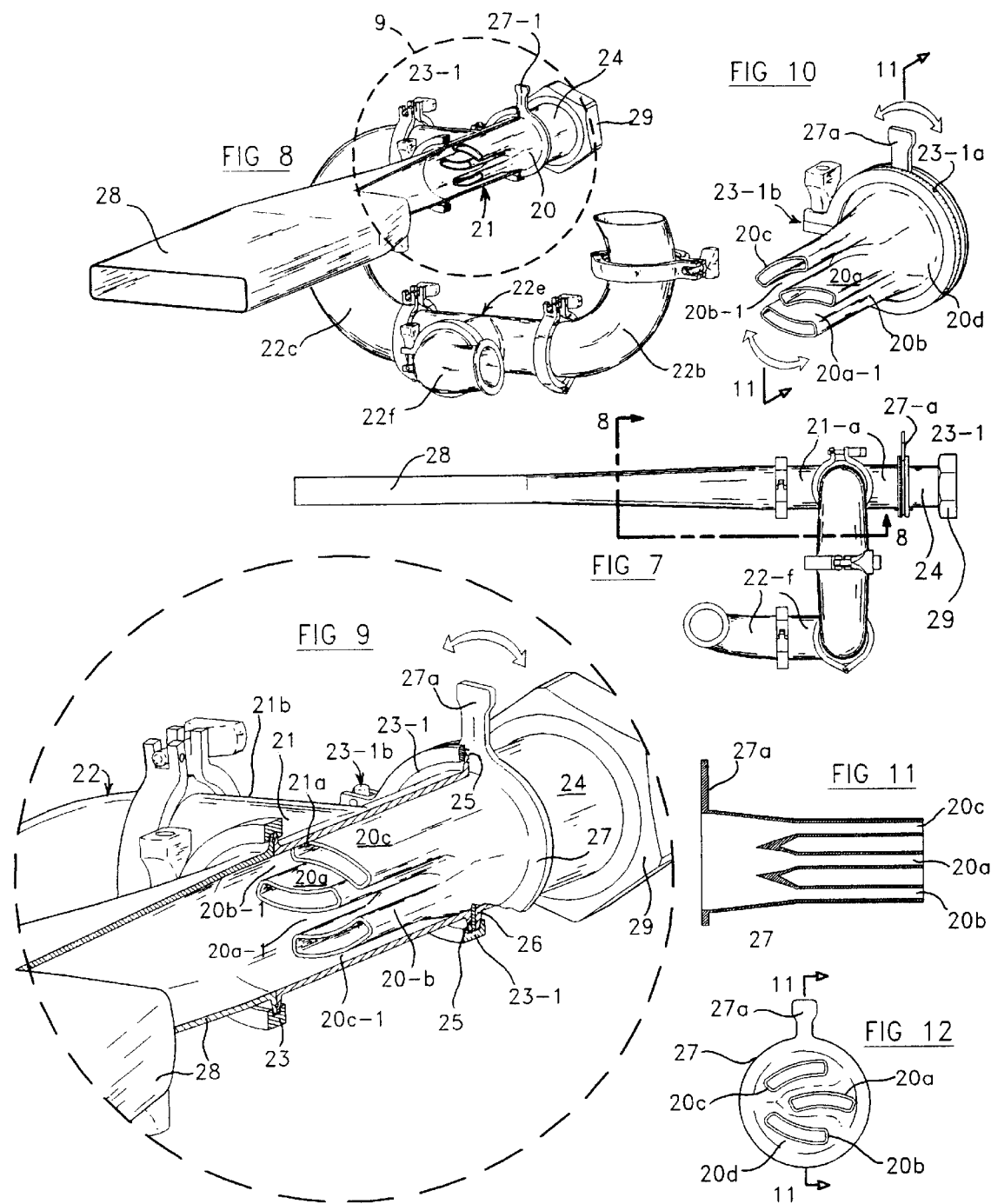

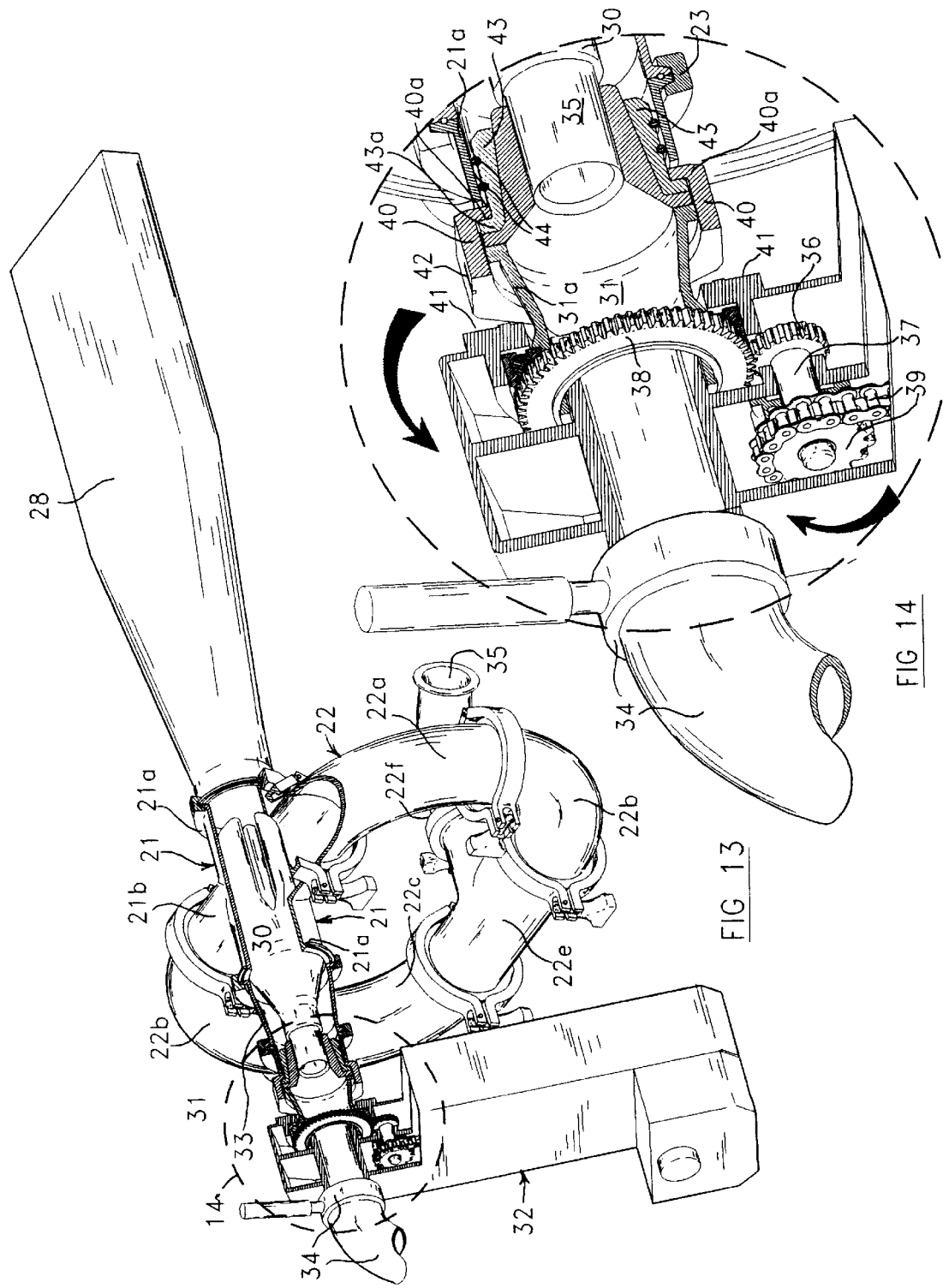

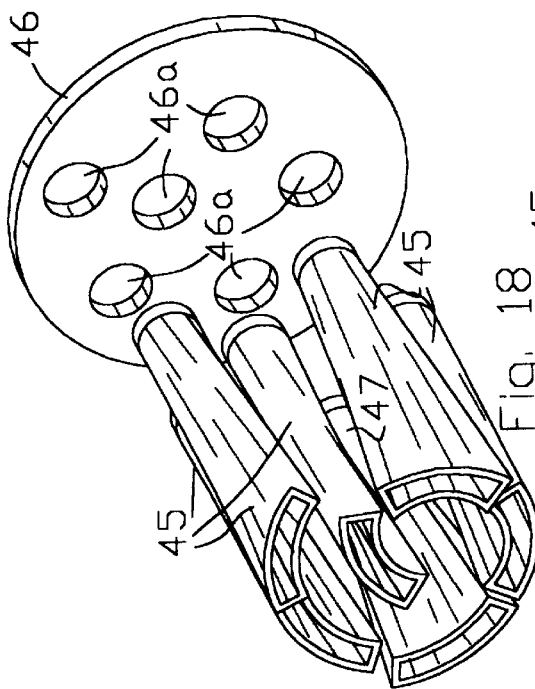
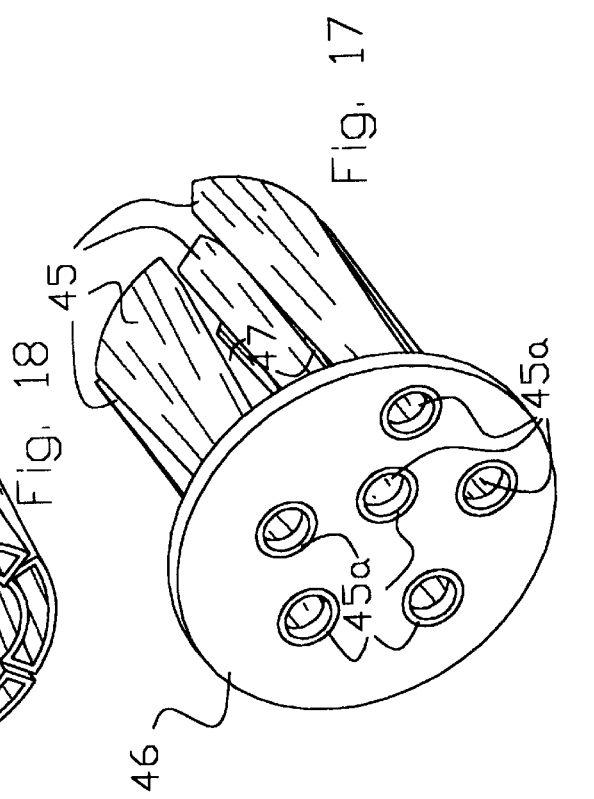
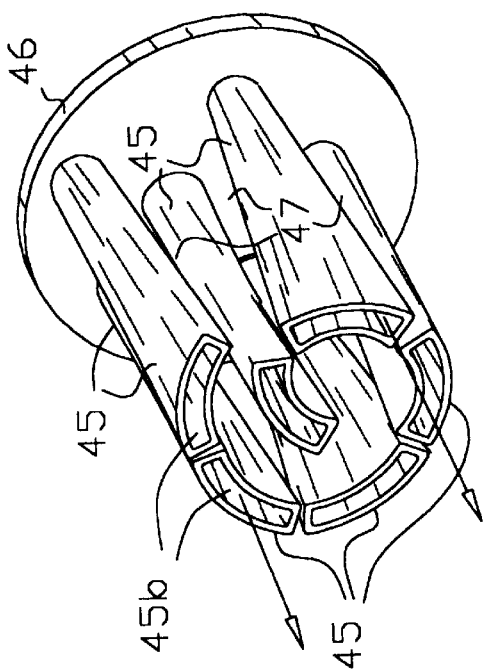
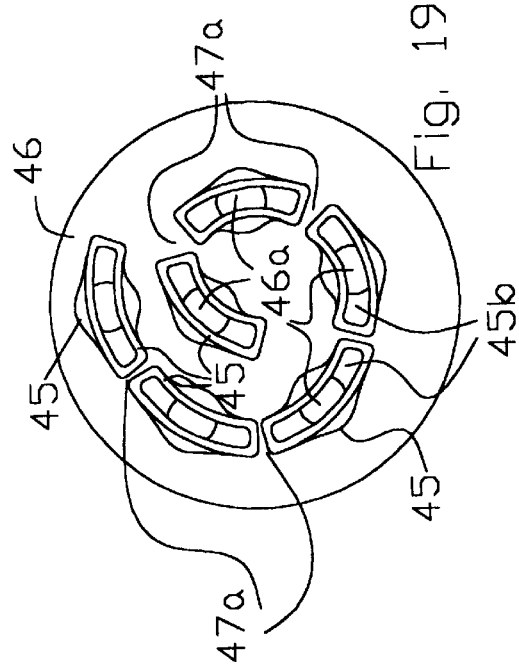

APPARATUS FOR EXTRUDING PRODUCTS MADE UP OF COMPOSITE MATERIALS

RELATED APPLICATION

This is a continuation-in-part of application Ser. No. 08/844,607, filed Apr. 12, 1997, entitled "Apparatus for Extruding Products Made Up of Composite Materials", abandoned.

BACKGROUND OF THE INVENTION

1. Field

The invention is in the field of apparatus for extruding desired composite products, especially food products such as synthetic bacon, from various kinds of food materials such as processed meat and fat.

2. State of the Art

Considerable work has been done in the past toward realization of an economically feasible machine for the purpose of producing a patterned, synthetic bacon product simulating natural bacon from various kinds and types of flesh and fat. Cheney U.S. Pat. No. 4,196,222 of Apr. 1, 1989 and U.S. Pat. No. 4,200,959 of May 6, 1980 were issued to Burns Foods, Ltd. of Calgary, Canada, and U.S. Pat. No. 4,340,994 of Jul. 27, 1982 and U.S. Pat. No. 4,480,980 of Nov. 6, 1984 were issued to Beehive Machinery, Inc. of Sandy, Utah, on patent applications of Feb. 12, 1980 and Feb. 28, 1977, respectively, for inventions in which the present inventor was a joint inventor. All of these patented machines have been reasonably successful in handling emulsified flesh and fat, whether of pork, chicken, or turkey. Other machines for producing various other types of composite products are shown in other prior U.S. and Canadian Patents.

SUMMARY OF THE INVENTION

It was conceived by the present inventor/applicant that the machines of the foregoing patents could be made more adaptable, not only to the producing of synthetic bacon but to the making of various other desired composite products, and that such machines could be made susceptible to quick and easy adjustment of component parts so as to easily modify interleaved patterns of the different materials in the resulting composite products, especially while the machines are running. Accordingly, he conceived of a machine and system of the type concerned in which the elongate extrusion die is rotatably mounted so it can be turned, from time to time, either manually or by motive means, about its longitudinal axis to different positions for easily changing the pat tern of the resulting composite product and which may be indexed for the movement from position to position, so as to produce a synthetic bacon product more in keeping with replication of the long accepted, natural, pork belly bacon product.

THE DRAWINGS

Embodiments of the invention constituting what are presently considered to be the best modes of carrying out the invention in actual practice are shown in the accompanying drawings, in which:

FIG. 1 represents an isometric view of a typical system and machine for producing slabs of simulated bacon with interleaving patterns for bacon strips sliced therefrom, the extrusion die being manually adjustable about its longitudinal axis from time to time to vary the pattern of bacon strips sliced from the slabs;

FIG. 2, a corresponding view exploded to show the individual component parts;

FIGS. 3 and 4, isometric views of respective alternative forms of the material-forming, discharge tube shown in FIGS. 1 and 2;

FIGS. 5 and 6, isometric views of respective alternative forms of the multipassage extrusion die shown as a part of FIG. 2;

FIG. 7, a top plan view of the machine of FIG. 1, but drawn to a reduced scale;

FIG. 8, an isometric view of the extrusion system shown in FIG. 1 but looking toward the product-forming, discharge end of the extrusion machine, and with part of the extrusion machine cut away as shown by the line 8—8 o f FIG. 7 to reveal internal structure otherwise hidden;

FIG. 9, a larger view of the portion of FIG. 8 that is encircled by the dotted line 9 in FIG. 8;

FIG. 10, an enlarged pictorial view of the extrusion die of FIG. 2 with feed pipe clamp, looking toward the discharge end of the die and with appended arrows showing rotative adjustability; thereof;

FIG. 11, a view in axial vertical section through only the die, as indicated by the section line 11—11 of FIG. 10;

FIG. 12, a right hand elevation of the die as shown in FIG. 11;

FIG. 13, a view corresponding to that of FIG. 1, but in reverse orientation and showing another embodiment of the invention in which the multipassage extrusion die is carried at the end of a foreshortened stuffing tube of a standard sausage stuffing machine, which tube in accordance with the invention is mounted for indexed rotation circularly from position to position about the longitudinal axis of the extrusion die, parts of the manifolds and of the stuffing machine being cut away to reveal internal parts;

FIG. 14, an enlarged view of that portion of FIG. 13 encircled by the broken line 14, with appended arrows showing directions of rotation;

FIG. 15, a view corresponding to a portion of FIG. 13, with appended arrows showing how rotational adjustment of the die can be effected by controlled rotation of the stuffing tube of the sausage machine from position to position;

FIG. 16, a perspective view looking toward the discharge end of an alternate form of die, which may be rotatable or not with respect to the apparatus in which it is installed;

FIG. 17, a similar view looking toward the entry end of the die of FIG. 16;

FIG. 18, a view similar to that of FIG. 16, with the extrusion conduit separated from an entry plate from which they extend; and FIG. 19, an elevational view of the discharge end of the die of FIG. 16.

DETAILED DESCRIPTION OF THE ILLUSTRATED EMBODIMENTS

Figure 1:
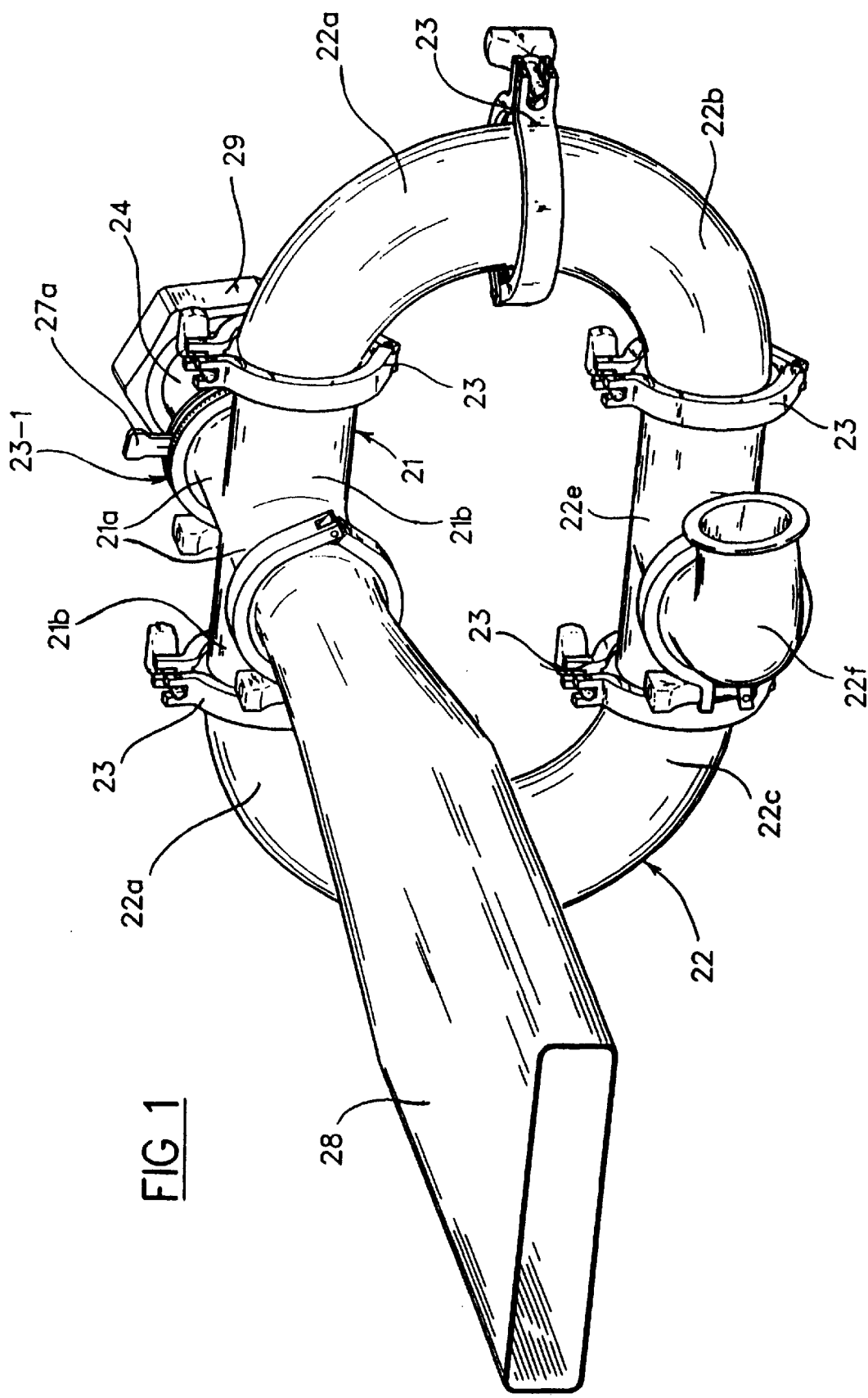

As illustrated in FIGS. 1 and 7–9, a typical embodiment of the apparatus of the invention is shown with a multipassage extrusion die 20, FIG. 2, as mounted, FIGS. 8 and 9, within a rectilinear, cylindrical, material-flow conduit portion 21a of a standard, cross-flow pipe fitting 21, said die 20 being mounted in said conduit portion 21a as a first material-flow conduit of the apparatus, for rotational adjustment manually from position to position about the longitudinal axis of the die and conduit as a center. Crossflow pipe fitting 21 has a similar rectilinear, cylindrical, material-flow conduit portion 21b crossing conduit portion 21a at right angles thereto and constituting second and third material-flow conduits, respectively, of the apparatus for connection by opposite ends of a material-supply manifold 22.

Manifold 22 is of loop configuration made up of quarter-turn sections 22a, b, c, and d, respectively, and a material input section 22e, all held together by respective clamping rings 23. Such material-supply manifold 22 connects at its opposite ends with and laterally of material-flow conduit portion 21a of crossflow pipe fitting 21, so that material supplied under pressure to an inflow nipple 22f of section 22e of material-supply manifold 22 enters material-flow conduit portion 21a of crossflow pipe fitting 21 at opposite lateral sides thereof and flows into spaces 20a-1, 20b-1 and 20c-1, respectively, FIGS. 9 and 10, between and around individual extrusion conduits 20a, b, and c, respectively, of extrusion die 20.

As shown in FIGS. 1 and 7–9, rotatably attached to one end of first material-flow conduit portion 21a of crossflow pipe fitting 21 is a material-supply conduit 24.

For simplicity of construction, it is preferred that the material-flow conduit portions of crossflow pipe fitting 21, the several sections of material-supply manifold 22, and the material-supply conduit 24 be cylindrical, with circular flanges at their ends for interconnecting purposes, but in any case the flanges 25 and 26, FIG. 9, of material-flow conduit portion 21a of crossflow pipe fitting 21 and of material-supply conduit 24, respectively, must be substantially circular to permit rotational movement of extrusion die 20, which has a substantially circular flange 27 held between the confronting faces of connection flanges 25 and 26 by means of a special clamping ring 23-1, FIGS. 7–9, that provides for manual adjustment of the position of die 20 in its receiving material-flow conduit portion 21a by means of an adjustment tab 27a extending therefrom for grasping by the user.

Extrusion die 20 has its multipassages provided by the individual, mutually spaced, elongate extrusion conduits 20a, b, and c, respectively, extending from an entry chamber portion 20d, see FIG. 11, of the die. Contrary to the aforementioned prior extrusion machines, it is a feature of the present invention that the extrusion die is rotatably movable from position to position (here by means of the tab 27a) relative to material-flow conduit portion 21a of crossflow pipe fitting 21, within which it fits. Moreover, prior apparatus of the type here concerned does not have an independent and rotatable die having a longitudinally extending, entry chamber portion, from which a plurality of extrusion conduits open and extend exteriorly of such chamber portion to discharge openings at the opposite end of the die.

It can be seen that in the form here shown there are the two material-supply conduits 22 and 24, respectively, for the supply of two different extrudable materials for a desired composite extrusion product. Conduit 24 feeds the flow passages within die conduits 20a, b, and c, respectively, while manifold conduit 22 feeds spaces 20a-1 and 20b-1 therebetween, as well as any space, see 20c-1, FIG. 9, between the several extrusion conduits of the die and the interior cylindrical surface of material-flow conduit portion 21a of crossflow pipe fitting 21.

The respective flows of the two different materials merge at the outflow ends of die conduits 20a, b, and c and flow together in an open merging space, within a forming discharge tube 28, here shown as rectangular, within which they are pressed together in the shape of such forming discharge tube, e.g. the shape of a typical slab of bacon, the two different materials and the multipassages of the die being selected and arranged for that purpose.

In accordance with one aspect of the invention as previously pointed out, extrusion die 20 is rotatable from position to position within its material-flow conduit portion 21a of crossflow pipe fitting 21 by reason of the mounting of its substantially circular flange 27 between the otherwise abutting faces of flanges 25 and 26 of material-flow conduit portion 21a and of material-supply conduit 24, it being only necessary to unclamp clamping ring 23-1 and to manually turn die 20 to a new position circumferentially thereof, by means of the tab 27a to alter the pattern of bacon strips that are cut from the extruded bacon slabs. Here, the special clamping ring 23-1, FIG. 10, has its annular ring resilient and circumferentially split, as at 23-1a, for accommodating tab 27a of die flange 27 through the arcuate path of adjustment provided at opposite sides of the usual clamping facilities 23-1b. Otherwise, the usual clamping ring 23 must be removed in order to affect adjustment by rotating the die.

The characteristics of the composite product can be changed by using different dies, such as the alternative dies 20-1 and 20-2, respectively, FIGS. 5 and 6, which, as shown, may have more or fewer extrusion conduits and have them similarly or differently shaped and arranged. It is preferred that the individual extrusion die conduits commence in individual openings arranged circumferentially of and spaced somewhat from the flanged forward end of the die, see FIGS. 10–12, to provide an open entryway 20d in common for the die conduits. The final composite product can have different geometrical shapes, depending upon the shape of the forming discharge tube 28, as are shown by the alternative shapes of such forming tubes in FIGS. 3 and 4.

FIG. 1 shows how the component parts appearing in FIG. 2 are assembled, with the die capable of rotative movement to other selected positions about its longitudinal axis, whether or not the adjustment tab 27a and the special clamping ring 23-1 of FIGS. 1–12 are provided for easy adjustment while the system is operating. Material-supplying conduit 24 is connected to a material-supplying source (not shown) of any suitable type, as by a large nut 29. The source may be a machine for supplying a material to be extruded through the conduits of die 23.

Figure 15:
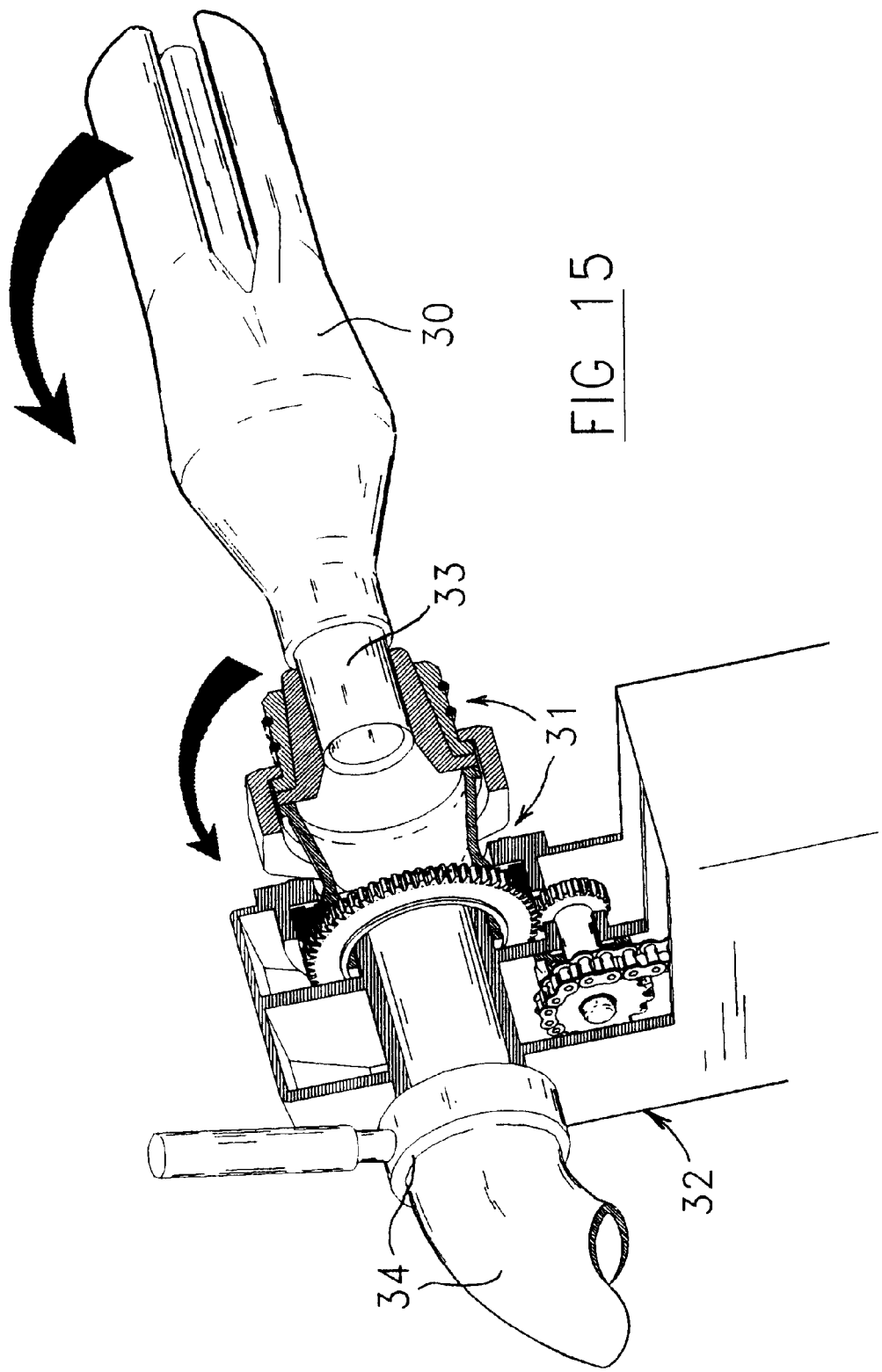

In FIGS. 13–15 are shown rotatable mounting of a multipassage extrusion die 30 in a special material discharge manifold 31 of a standard sausage stuffing machine, shown partially at 32, which may be a type 835, Robot 500, "Vemag" machine manufactured by Vemag Verdiner Maschinen Apparatebau GMBH, Verden (Aller), Germany, and distributed in the USA by Robert Reiser & Co., Inc., Canton, Mass. The die 30 is elongated for the purpose, and the usual stuffer tube 33, to which it is connected by a press fit, is foreshortened to provide the usual mechanism of the sausage stuffing machine to control rotation and positional indexing of such extrusion die. Material is fed from the sausage stuffer machine through a tubular fitting 34 into the stuffer tube 33 of the machine, which is mounted for controlled rotation by mechanism and controls built into the machine, see accompanying pages from a recent "Vemag" catalog incorporated herein by reference.

As shown, the assembled crossflow pipe fitting 21 and associated material-supplying manifold assembly 22, with its material-supply section 22f and with product-forming discharge tube 28 of FIGS. 1, 2, and 7–9, are connected by a conduit 35, FIG. 13, from a different material supplying source such as a second sausage stuffing machine, discharging into manifold 22.

Indexing of rotation of die 30 is provided in connection with the usual mechanism for rotating stuffer tube 32 of the sausage stuffing machine. It comprises the usual drive pinion 36, FIGS. 13–15, on a drive shaft 37 and in mesh with a driven gear 38 affixed to discharge manifold 31 of the machine. Drive shaft 37 is rotated by a drive motor (not shown) through a sprocket and chain drive 39 connected with the motor. Discharge manifold 31 feeds one material from the sausage stripping machine 32 into stuffer tube 33 of the machine, which feeds it into the feed end of die 30. As previously indicated, such die may be rotated from adjusted position to adjusted position under the usual starting and stopping controls of the sausage stuffing machine. As here shown, the discharge manifold 31 comprises tubular part 31a press fit onto stuffer tube 33 and connected end-to-end, by a special nut 40, with tubular part 31a to which driven gear 38 is affixed. For indexing purposes, the exposed face of annular entry portion 32a of sausage forming machine 32 is marked with an indexing scale 41, either by indentation of such face or by applying thereto a strip so marked, and nut 40 (which rotates with discharge manifold 31) carries an indexing marker 42 indicative of how far from the beginning of the scale the die has travelled along the circular path of rotative adjustment.

Special nut 40 is annularly flanged inwardly at 40a so that, when threaded onto the mating threads of the threaded outer faces of confronting flanged portions of tubular parts 31a and 31b of discharge manifold 31, the flange 40a presses such confronting flanged portions together by a clamping action. Such clamping action also includes an outwardly turned, annular flange 43a of an elongate ring fitting 43 as interposed between tubular part 31b of discharge manifold 31 and conduit portion 21a of cross flow fitting 21 for mounting sealing O-rings 44. Ring fitting 43 fits closely a round part 31b of discharge manifold 31.

Although indexing means are not needed in association with manually adjustable extrusion die 20, they can easily be provided by applying an indexing scale around a visible annular face of the special clamp 23-1 and an indexing marker on the adjacent area of conduit portion 21a.

In FIGS. 16–19 is shown an alternate form of the extrusion die that may or may not be rotatable in or with respect to the extrusion apparatus in which it is designed to be installed, yet as with the previously described die embodiments, it has a plurality of elongate extrusion conduits, here designated 45, which are mutually spaced apart and extend longitudinally from open, mutual-entry ends 45a at an entry portion of the die, which may be chambered with a bottom plate through which the extrusion conduits extend, as in the previous embodiments, or which may be simply a flat plate 46 as shown. In either event, the extrusion conduits 45 preferably, as shown, have open end portions which extend through holes, here 46c in the entry plate of the die, to the opposite, discharge end of the die, where they terminate in discharge openings 45b. This means that the die is completely independent of the apparatus into which it is adapted to be installed and can be removed and replaced as desired for cleaning or otherwise substantially without tearing down the apparatus into which it fits.

Significantly, in the present embodiment the extrusion conduits extend longitudinally and are spaced apart in substantially a spiral arrangement so as, for example, to produce a spiral arrangement of white meat within dark meat of chicken or turkey in synthesized bacon, the white meat being fed into the extrusion conduits and the dark meat being fed into the space or spaces surrounding the extrusion conduits.

The extrusion conduits 45 are preferably polygonal, and more preferably, rectangular in shape in transverse cross section, being arranged and spaced apart in end-to-end fashion spirally, as shown, so that meat material fed therebetween will substantially retain whatever meat fiber character they might naturally have. Also, as shown, it is preferable that such extrusion conduits taper inwardly longitudinally, either along substantially their entire lengths, as shown, or a t least partially along their lengths, into the oppositely, i.e. outwardly, tapered slots 47 therebetween.

The thickness of the respective layers of the layered spiral product emerging from the discharge end of the die is governed by the spiral geometry in any particular instance. The spacings 47a, FIG. 19, between the discharge ends 45b of the individual extrusion conduits 45 may be as thin as desired to substantially insure cohesion of the individual sections of the spiral white meat layer of the final extrusion product.

Wherever the word "substantially" is used, it requires only that conformity with the requirement that follows which accomplishes performance of the requirement without absolute adherence to the requirement.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for extruding products made up of composite materials, said apparatus comprising a substantially rectilinear, first material-flow conduit having an open entry end portion and an opposite, open, discharge end portion; an independent, rotatable, elongate, multipassage, extrusion die of substantially cylindrical formation comprising a longitudinal, entry chamber at a material entry end thereof, from which extend at least two elongate extrusion conduits along the longitudinal axis of the die in transversely spaced relationship, said extrusion conduits having entry openings, respectively, at one set of ends thereof within said entry chamber of the die for receiving material introduced into said entry chamber, said extrusion conduits extending from said entry chamber exteriorly thereof toward material discharge from the apparatus, having respective discharge openings at the opposite ends thereof, and being spaced apart exteriorly of said entry chamber for the flow of material therebetween transversely thereof, said die being rotatably mounted within said apparatus for rotation in and of itself therewithin, and said entry chamber of the die being in open communication with the said open entry portion of said first material-flow conduit of the apparatus for receiving material therefrom for entry into said extrusion conduits of the die; second and third material-flow conduits of the apparatus having discharge openings interconnected with said first material-flow conduit externally of but within the length of the said extrusion conduits of the die; and means for feeding a different material of said composite materials into said second and third material-flow conduits of the apparatus in which the die is positioned.

2. Apparatus according to claim 1, wherein the means rotatably mounting the extrusion die are substantially circular and rotatably connect said extrusion die at its open, material input end with the first material-flow conduit of the apparatus so said die is rotatable from position-to-position circularly of its longitudinal axis.

3. Apparatus according to claim 2, wherein the longitudinal extending, first material flow conduit of the apparatus is a substantially rectilinear flow conduit portion of a crosssflow pipe fitting in which the extrusion conduits of the die extend and discharge; and a substantially rectilinear, crossflow conduit portion of said crossflow pipe fitting extending transversely through said longitudinally extending conduit portion of said crossflow pipe fitting and constituting said second and third material-flow conduits.

4. Apparatus according to claim 3, wherein the transversely extending crossflow conduit portion is part of a looped-flow conduit for supplying the different material of the composite material and has opposite, open, discharge ends connected oppositely, respectively, with the rectilinear flow conduit portion of the crossflow pipe fitting.

5. Apparatus according to claim 4, wherein a product-forming discharge tube is connected to the open discharge end of the longitudinally extending, flow conduit portion of the crossflow pipe fitting.

6. Apparatus according to claim 1, wherein the extrusion die has a longitudinally extending entry portion into which the extrusion conduits open and from which said conduits extend in common.

7. Apparatus according to claim 6, wherein the entry portion of the die is provided by a substantially cylindrical wall having a peripheral flange at its entry end.

8. Apparatus according to claim 2, wherein the circular means rotatably connecting the material input end of the extrusion die with the material-flow conduit is a substantially circular, outwardly extending flange about the material input end of the extrusion die.

9. Apparatus according to claim 1, wherein the means rotatably mounting the die is the rotatable stuffer tube of a sausage stuffing machine.

10. Apparatus according to claim 9, wherein the stuffer tube of the sausage stuffing machine is rotatably connected to rotatable mechanism of the stuffing machine by the means for feeding a material into the extrusion conduits of the die.

11. Apparatus according to claim 10, wherein the means or feeding a material into the extrusion conduit of the die comprises a rotatable, material discharge manifold affixed at one end to the rotatable mechanism of the stuffing machine and at the other end to the stuffer tube of said machine, with means for introducing said material into said manifold at its said one end.

12. Apparatus according to claim 11, wherein the stuffing tube of the sausage stuffing machine mounts the extrusion die within the material-flow conduit, said material-flow conduit being rotatably attached to the said other end of the material discharge manifold.

13. Apparatus according to claim 12, wherein the rotatable material discharge manifold has an outer, visually observable surface adjacent to stationary structure, both of which carry cooperable, visually observable indexing means indicative of the extent of any positionable adjustment of the extrusion die.

14. Apparatus according to claim 1, wherein are included visually observable indexing means for indicating the extent of any position-to-position adjustment of the extrusion die.

15. Apparatus according to claim 1, wherein the spacing of the extrusion conduits of the die from one another and the open continuation of the first material-flow conduit of the apparatus are adapted to extrude the respective food materials to form a composite extrusion product simulating a natural bacon slab.

16. An independent, elongate, multipassage extrusion die of substantially cylindrical formation for installation in an apparatus for extruding composite materials, said die comprising an entry portion having a plate extending transversely of the length of the die; and a plurality of extrusion conduits extending longitudinally of the die from respective entry openings through said plate and terminating in respective discharge openings at the opposite end of the die, said conduits being spaced apart longitudinally and arranged in substantially spiral formation from entry to discharge ends thereof so material extruded through said extrusion conduits will be separated longitudinally thereof by material passed into said die laterally thereof and will be extruded therefrom at the said discharge end of the die when installed in said apparatus.

17. An extrusion die according to claim 16, wherein the extrusion conduits are of substantially polygonal formation, respectively, at their discharge ends and with their widths and the spaces between them extending along the spiral formation.

18. An extrusion die according to claim 17, wherein the extrusion conduits are of substantially rectangular formation at their discharge ends, the ends of the rectangles being separated by the spaces between the extrusion conduits, respectively.

19. An extrusion die according to claim 16, wherein the widths of the extrusion conduits taper inwardly longitudinally as they extend toward the discharge openings thereof while the spaces therebetween taper in reverse.

* * * * *